(12) United States Patent
Sandstrom

(10) Patent No.: US 6,251,992 B1
(45) Date of Patent: Jun. 26, 2001

(54) RUBBER COMPOSITION CONTAINING HYDROXYL TERMINATED POLYALKYLENE POLYMER AND TIRE WITH TREAD THEREOF

(75) Inventor: Paul Harry Sandstrom, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/393,733

(22) Filed: Sep. 10, 1999

(51) Int. Cl.[7] .......................... C08L 29/02; B60C 11/00; C08F 36/08; C08F 236/10
(52) U.S. Cl. ................. 525/79; 525/326.1; 525/331.9; 525/332.9; 525/333.1; 525/333.2; 525/333.3; 152/209.1; 152/209.5
(58) Field of Search .............................. 525/79, 191, 192, 525/197, 326.1, 331.9, 332.9, 333.1, 333.2, 333.3; 152/209.1, 209.5

(56) References Cited

U.S. PATENT DOCUMENTS

| | | | | |
|---|---|---|---|---|
| 5,354,618 | * | 10/1994 | Ishigaki et al. | 428/424.8 |
| 5,504,164 | * | 4/1996 | O'Donnell | 525/346 |
| 5,817,719 | * | 10/1998 | Zanzig et al. | 125/212 |

\* cited by examiner

*Primary Examiner*—David W. Wu
*Assistant Examiner*—R. Harlan
(74) *Attorney, Agent, or Firm*—Henry C Young, Jr.

(57) ABSTRACT

This invention relates to a rubber composition comprised of a combination of cis 1,4-polyisoprene rubber and at least one liquid hydroxyl terminated polyalkylene polymer and to such a composition being sulfur cured. The rubber composition can also contain an additional diene-based elastomer. The rubber composition contains reinforcement as carbon black or as carbon black and/or silica together with a coupling agent. The invention also relates to a tire having a tread of such rubber composition.

71 Claims, No Drawings

RUBBER COMPOSITION CONTAINING HYDROXYL TERMINATED POLYALKYLENE POLYMER AND TIRE WITH TREAD THEREOF

FIELD

This invention relates to a rubber composition comprised of a combination of cis 1,4-polyisoprene rubber and at least one liquid hydroxyl terminated polyalkylene polymer and to such a composition being sulfur cured. The rubber composition can also contain an additional diene-based elastomer. The rubber composition contains reinforcement as carbon black or as carbon black and/or silica together with a coupling agent. The invention also relates to a tire having a tread of such rubber composition.

BACKGROUND

Tires are sometimes prepared with treads of rubber compositions comprised of diene-based elastomers which contain reinforcement as carbon black or as silica in combination with a coupling agent to aid in coupling the silica to diene-based elastomers.

A coupling agent for such purpose usually has a moiety which is reactive with hydroxyl groups on the silica (e.g.: silanol groups) and another moiety which is interactive with diene-based elastomers. Such philosophy is well known to those having skill in such art.

Representative of such coupling agents are, for example, bis-(3-alkoxysilanealkyl) polysulfides which contain from two to eight sulfur atoms in their polysulfide bridges, with an average of from 3.5 to 4.5 for a tetrasulfide material and an average of about 2 to about 2.6 for a disulfide material. For such coupling agent, the alkoxysilane is available to react with the silanol groups on the silica.

In the description of this invention, the term "phr" as used herein, and according to conventional practice, refers to "parts of a respective material per 100 parts by weight of rubber elastomer". In the description of this invention, the terms "rubber" and "elastomer" can be used interchangeably, unless otherwise distinguished. The terms "rubber composition", "compounded rubber" and "rubber compound" can be used interchangeably to refer to "rubber which has been blended or mixed with various ingredients and materials" and the terms "cure" and "vulcanize" may also be used interchangeably herein, unless otherwise noted and such terms are well known to those having skill in the rubber mixing or rubber compounding art.

PRACTICE AND SUMMARY OF THE INVENTION

This invention relates to a rubber composition comprised of at least one diene-based elastomer, composed primarily of cis 1,4-polyisoprene rubber, and at least one liquid hydroxyl terminated polyalkylene polymer, together with reinforcement as carbon black or as carbon black and/or silica together with a coupling agent; wherein said coupling agent is designed to have a moiety to react with the hydroxyl groups contained on the surface of the liquid polymer as well as hydroxyl groups on the surface of the silica and another moiety to interact with the diene-based rubber.

In accordance with this invention, a rubber composition is provided which is comprised of, based upon 100 parts by weight of its rubber component (phr), (A) 100 parts by weight (phr) of at least one diene-based elastomer comprised of (i) about 55 to about 100, alternatively about 75 to about 100 or about 90 to about 100, phr of cis 1,4-polyisoprene rubber and (ii) from zero to 45, alternatively about zero to about 25 or about 0 to about 10, phr of at least one other diene-based rubber selected from homopolymers and copolymers of conjugated diene and copolymers of at least one conjugated diene with a vinyl aromatic compound selected from styrene and alpha-methylstyrene, preferably styrene, (B) about one to about 50, alternatively about 2 to about 25 or about 2 to about 10, phr of a liquid hydroxyl terminated polyalkylene polymer; wherein the alkylene mer unit for said polyalkylene is selected from at least one of alkylene hydrocarbons containing from 2 to 5, alternatively from 2 to 4, carbon atoms, and wherein said polyalkylene polymer is (i) mono hydroxyl terminated with a primary hydroxyl group or (ii) di-hydroxyl terminated with primary hydroxyl groups, (C) about 20 to about 100, alternatively from about 35 to about 90, phr of particulate reinforcing filler as (1) carbon black or (2) carbon black and silica-based reinforcement; wherein said silica-based reinforcement is selected from at least one of amorphous silica, aluminosilicate and carbon black which contains silicon on its surface; wherein said silica-based reinforcement contains hydroxyl groups on its surface, together with a coupling agent for said silica-based reinforcement; wherein said coupling agent contains a moiety which is reactive with hydroxyl groups on the surface of said silica-based reinforcement and with hydroxyl groups of said hydroxyl terminated polyalkylene polymer groups and another moiety interactive with said elastomer(s).

In practice, it is preferred that said reinforcement is comprised of carbon black and silica-based reinforcement together with a coupling agent; wherein the weight ratio of said silica-based reinforcement to carbon black reinforcement is in a range of from 1/10 to 10/1.

In practice, the polyalkylene component for said polyalkylene of said hydroxyl terminated polyalkylene is derived by hydrogenating a polymer, prepared by organic solution polymerization, of at least one of isoprene and 1,3-butadiene, thereby yielding a hydroxyl terminated polyalkylene comprised of at least one of ethylene, propylene and butylene units.

Alternatively, such polyalkylene component may be a partially hydrogenated polymer of isoprene and/or 1,3-butadiene.

Preferably the polyalkylene component is a hydrogenated, or partially hydrogenated, polymer of isoprene or of 1,3-butadiene.

It is contemplated that the total hydrogenation of the polymer of isoprene and/or 1,3-butadiene provides a polymer having a saturated polyalkylene structure or a combination of saturated and unsaturated structure when partially hydrogenated.

In practice, it is preferred that said liquid hydroxyl terminated polyalkylene is mono-hydroxyl terminated or di-hydroxyl terminated with primary hydroxyl group(s); wherein for said di-hydroxyl terminated polyalkylene polymer, said hydroxyl terminal groups are primary hydroxyl groups.

In practice, said liquid hydroxyl terminated polyalkylene polymer preferably may have an equivalent weight range from about 250 to about 70,000, more preferably about 500 to about 7,000, so long as it is liquid at room temperature, or at about 23° C., namely that it is readily pourable at such temperature.

An example of suitable liquid hydroxyl terminated polyalkylene polymers are those available from Shell Chemical, namely, Kraton L-1203 for a mono-hydroxyl terminated polymer and Kraton L-2203 for a di-hydroxyl terminated polymer.

In practice, the cis 1,4-polyisoprene rubber may be natural rubber or synthetic rubber. Usually the natural rubber is preferred.

In the practice of this invention, various additional diene-based elastomers, or rubbers, may be used in combination with the cis 1,4-polyisoprene rubber. It is considered that the additional elastomer, as a diene-based elastomer, is a sulfur curable, (e.g.: vulcanizable), elastomer. The additional elastomers utilized in accordance with this invention may be derived from the polymerization of conjugated diene monomers which typically contain from 4 to 12 carbon atoms and preferably contain from 4 to about 8 carbon atoms. Representative examples of such conjugated diene monomers are preferably 1,3-butadiene and/or isoprene. The elastomer can also be a copolymer of such dienes with a vinyl aromatic monomers such as, for example, styrene and alpha-methylstyrene, preferably styrene.

Such additional elastomers may be selected from, for example, cis 1,4-polybutadiene, styrene-butadiene copolymers(SBR), isoprene/butadiene copolymers, styrene/isoprene copolymers, high vinyl polybutadiene having a vinyl 1,2- content in a range of about 40 to about 90 percent, 3,4-polyisoprene, trans 1,4-polybutadiene and styrene/isoprene/butadiene terpolymers.

Preferably, such additional elastomers are selected from cis 1,4-polybutadiene, butadiene/styrene copolymers, styrene/isoprene/butadiene terpolymers, isoprene/styrene copolymers and isoprene/butadiene copolymers.

For example, a combination of two or more rubbers may include in combination the cis-1,4-polyisoprene as a major portion of the elastomers, preferably at least 55 percent by weight, and an additional rubber as, for example, styrene/butadiene rubber (emulsion and/or solution polymerization derived styrene/butadiene rubber, referred to herein as E-SBR and S-SBR), isoprene/butadiene rubber (IBR), styrene/isoprene rubber and styrene/isoprene/butadiene terpolymer (SIBR).

Alternatively, tin coupled organic solvent solution polymerization prepared elastomers of at least one of isoprene and/or 1,3-butadiene may be used. Exemplary of a tin coupled elastomer may be found in U.S. Pat. No. 5,514,756.

In one aspect of this invention, an emulsion polymerization derived styrene-butadiene rubber(E-SBR) and a solution polymerization derived styrene-butadiene rubber (S-SBR) may be used having a relatively conventional styrene content of about 20% to about 35% bound styrene. However, and preferably in order to provide a relatively high Tg elastomer, the E-SBR and S-SBR have a high bound styrene content in a range of about 35% to about 50% and a vinyl content for their butadiene portions being in an intermediate range of about 20 to about 60 percent.

Such a relatively high styrene content of about 35% to about 50% for the E-SBR and S-SBR, together with the aforesaid intermediate vinyl content, can be considered beneficial for a purpose of enhancing traction, or skid resistance, of the tire tread.

In one aspect, the presence of the E-SBR, if used, is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art.

The solution polymerization prepared SBR (S-SBR), IBR and SIBR can be conveniently prepared, for example, by organo-lithium catalyzation in the presence of an organic hydrocarbon solvent.

The cis-1,4-polybutadiene rubber (BR), if used, is considered to be beneficial for a purpose of enhancing the tire tread's wear or treadwear. Such BR can be prepared, for example, by organic solution polymerization of 1,3-butadiene. The BR may conveniently be characterized, for example, by having at least a 90% cis-1,4 content.

In practice the rubber compositions of this invention can be prepared by simply mixing the liquid, hydroxyl terminated polyalkylene polymer together with the elastomer(s), particulate reinforcement and coupling agent. This can be done utilizing a wide variety of mixing techniques. In most cases, the mixing will be carried out utilizing a Banbury mixer or a mill mixer. It will generally be preferred to mix the liquid polymer into the elastomer during the non-productive compounding stage.

However, in the alternative, the liquid hydroxyl terminated polyalkylene polymer can be mixed with the elastomer composition prior to mixing with the remainder of the ingredients except, for example, an antidegradant or, for example, rubber processing oil in a case of an oil extended rubber.

As is conventional practice, well known to those skilled in such art, the rubber compositions mixed in preparatory non-productive mixing stages (non-productive compounds) do not conventionally contain a curative, such as sulfur, or accelerators for the curative. On the other hand, rubber compositions subsequently mixed in productive mixing stages (productive compounds) contain a curative which will cure (vulcanize) the rubber after it is heated to a curing temperature.

The rubber compositions of this invention will frequently and conventionally contain a variety of additional compounding ingredients and/or additives. Typical amounts of processing aids and rubber compounding ingredients may comprise about 1 to about 50 phr. Such processing aids can include, for example, aromatic, naphthenic, and/or paraffinic processing oils. Stearic acid is typically referred to as a "rubber compounding ingredient". As purchased, it typically contains primarily stearic acid with small amounts of at least one of oleic acid, linolenic acid and/or palmitic acid. The mixture may also contain small amounts (less than about six weight percent) of myristic acid, arachidic acid and/or arachidonic acid. Such material or mixture is conventionally referred to in the rubber compounding art as "stearic acid". Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 0.5 to about 3 phr. Typical amounts of fatty acids, if used which can include stearic acid, comprise about 0.5 to about 3 phr. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur-vulcanizing agent. Examples of suitable sulfur-vulcanizing agents include elemental sulfur (free sulfur) or sulfur-donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to about 4 phr, or even in some circumstances, up to about 8 phr, with a range of from about 1.5 to about 2.5, sometimes from 2 to 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.8, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Some representative examples of primary accelerators which can be utilized include thiazole accelerators, such as benzothiazyldisulfide and 2-mercaptobenzothiazole; sulfenamide accelerators, such as N-oxydiethylene benzothiazole-2-sulfenamide, N-t-butyl-2-benzothiazolesulfenamide and N-cyclohexyl-2-benzothiazolesulfenamide; dithiocarbamate accelerators, such as bismuth dimethyldithiocarbamate, cadmium diethyldithiocarbamate, copper dimethyldithiocarbamate, lead dimethyldithiocarbamate, selenium diethyldithiocarbamate, tellurium diethyldithiocarbamate and zinc dimethyldithiocarbamate; thiuram accelerators such as dipentamethylene thiuram hexasulfide, tetramethylthiuram monosulfide and tetraethylthiuram monosulfide; and thiourea accelerators, such as trimethyl thiourea and dimethylethyl thiourea. If a second accelerator is used, the secondary accelerator is preferably a guanidine, dithiocarbamate or thiuram compound.

Various carbon blacks can be used. Representative of such carbon blacks for tire tread purposes are, for example, those with ASTM designations of N110, N121, N220, N234 and N299.

The commonly-employed siliceous pigments used in rubber compounding applications can be used as the silica in this invention, including pyrogenic and precipitated siliceous pigments (silica), although precipitate silicas are preferred.

The siliceous pigments preferably employed in this invention are precipitated silicas such as, for example, those obtained by the acidification of a soluble silicate, e.g., sodium silicate. Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica might be expected to have an average ultimate particle size, for example, in the range of 0.01 to 0.05 micron as determined by the electron microscope, although the silica particles may be considered for use in this invention such as, only for example herein, and without limitation, silicas commercially available from PPG Industries under the Hi-Sil trademark with designations 210, 243, etc.; silicas available from Rhodia such as, for example Zeosil 1165MP and Degussa with, for example, designations VN2 and VN3, and silicas from Akzo Chemical, etc.

The elastomeric compositions of this invention may be used, for example, as a high performance tire tread intended to be used at relatively high speeds.

EXAMPLE I

A series of samples were prepared to evaluate the use of liquid hydroxyl terminated polyalkylene polymers in diene-based rubber compositions which contain silica-based particulate reinforcement and carbon black together with a coupling agent.

Control rubber compositions are prepared as Samples A and F which contained 5 phr of naphthenic/paraffinic rubber processing oil with 35 phr of silica, 15 phr of carbon black and 5 phr of 50 percent active coupling agent.

Experimental rubber compositions as Samples B-E are prepared which contain the liquid hydroxyl terminated polyalkylene polymers.

In particular, an elastomer composition is prepared from ingredients shown in Table 1 which represents a formulation in which the amount of liquid hydroxyl terminated polyalkyline polymers is shown as being variable. Actual amounts of the processing oil and hydroxyl terminated polyalkyline polymers are shown in Table 2 of the subsequent Example II and the samples thereof identified therein as Samples A–F together with various associated physical properties.

The Samples are prepared in a three stage, sequential, mixing process in an internal rubber mixer, namely, first and second non-productive mixing stages followed by a productive mixing stage.

The elastomers, indicated compounding ingredients and liquid hydroxyl terminated polyalkylene polymer are added in the first, non-productive mixing stage and a portion of the silica and coupling agent are added in both the first and second non-productive mixing stages. The mixing is conducted in the first stage for about 4 minutes to a temperature of about 160° C., dumped from the internal mixer. After cooling to about room temperature, or about 25° C., the rubber composition is then mixed in the second mixing stage, with the aforesaid additional silica and coupler being added, and the composition mixed for about 4 minutes at a temperature of about 160° C., after 2 minutes of mixing to reach such temperature. The mixture dumped from the mixer and sheeted out on a two mill roll.

The sulfur curative and accelerator(s) are added in a subsequent productive mixing stage for about two and a half minutes to a temperature of about 110° C.

Conventional amounts of stearic acid, zinc oxide, and antidegradants were used with specific amounts of other ingredients as shown in the following Table 1.

TABLE 1

|  | Parts |
|---|---|
| First Non-Productive Mix Stage | |
| Polyisoprene rubber[1] | 100 |
| Carbon black[2] | 15 |

TABLE 1-continued

| | Parts |
|---|---|
| Silica[3] | 20 |
| Zinc oxide | 5 |
| Fatty acid | 2 |
| Antioxidant[4] | 2 |
| Coupling agent composite[5] | 3 |
| Rubber processing Oil[6] | Variable |
| Mono-hydroxyl terminated liquid polyalkylene polymer[7] | Variable |
| Di-hydroxyl terminated liquid polyalkylene polymer[8] | Variable |
| Second Non-Productive Mix Stage | |
| Silica[3] | 15 |
| Coupling agent composite[5] | 2 |
| Productive Mix Stage | |
| Sulfur | 1.5 |
| Accelerator, sulfenamide type | 2 |
| Accelerator, diphenylguanidine | 0.5 |

[1]Synthetic cis 1,4-polyisoprene rubber as Natsyn 2200 from The Goodyear Tire & Rubber Company.
[2]N299.
[3]Particulate precipitated silica as Hi-Sil 210 from PPG Industries, Inc.
[4]Of the polymerized 1,2-dihydro-2,2,4-trimethylquinoline type.
[5]Composite of bis-(3-triethoxysilylpropyl) tetrasulfide and carbon black in a 50/50 ratio as X5OS from Degussa AG.
[6]Naphthenic/paraffinic processing oil as Flexon 641 from the Exxon company.
[7]Obtained as Kraton Liquid L-1203 from the Shell Chemical company.
[8]Obtained as Kraton Liquid L-2203 from the Shell Chemical company.

The series of Samples A–F, with Samples A and F as Controls, were prepared as illustrated in Table 2.

The rubber compositions were prepared from the formulation represented in Table 1 using the referenced "variable" amounts of liquid hydroxyl terminated polyalkylene polymers and added rubber processing oil as shown in the following Table 2.

The rubber compositions were vulcanized in a suitable mold by heating for about 36 minutes to a temperature of about 150° C.

Various physical properties of the vulcanized rubber Samples A–F are shown in the following Table 2 and Table 2A.

The stress-strain, hardness, and rebound physical properties were determined with a ring tensile specimen on an automated basis via an Automated Testing System (ATS) instrument.

TABLE 2

| Ingredients | Sample A Control | Sample B | Sample C |
|---|---|---|---|
| Processing oil | 5 | 2.5 | 0 |
| Mono-hydroxyl terminated polyalkylene polymer | 0 | 2.5 | 5 |
| DI-hydroxyl terminated polyalkylene polymer | 0 | 0 | 0 |
| Properties | | | |
| Rheometer (150° C.) | | | |
| Max. Torque, dNm | 43 | 41.9 | 42.5 |
| Min. Torque, dNm | 7 | 6.9 | 6.3 |
| Delta torque | 36 | 35 | 36.2 |
| T$_{90}$, minutes | 15.8 | 16.8 | 16.3 |
| Stress-Strain | | | |
| Tensile, MPa | 22.8 | 22.6 | 23.1 |
| Elongation, % | 540 | 540 | 545 |
| Modulus, 100%, MPa | 2.8 | 2.7 | 2.8 |
| Modulus, 300%, MPa | 11.8 | 11.5 | 11.9 |
| Rebound, 100° C., % | 70 | 68 | 68 |
| Hardness, Shore A, 100° C. | 62 | 62 | 63 |
| Tear strength, N, 95° C. | 58 | 80 | 71 |
| Rheovibron | | | |
| E' at 60° C., MPa | 12.5 | 12.4 | 13 |
| Tan.Delta at 60° C. | 0.05 | 0.06 | 0.06 |
| DIN Abrasion, cm$^3$ | 132 | 125 | 123 |

TABLE 2A

| Ingredients | Sample D | Sample E | Sample F |
|---|---|---|---|
| Processing oil | 2.5 | 0 | 5 |
| Mono-hydroxyl terminated polyalkylene polymer | 0 | 0 | 0 |
| DI-hydroxyl terminated polyalkylene polymer | 2.5 | 5 | 0 |
| Properties | | | |
| Rheometer (150° C.) | | | |
| Max. Torque, dNm | 42.5 | 40.7 | 44 |
| Min. Torque, dNm | 6.7 | 7 | 7 |
| Delta torque | 35.8 | 33.7 | 37 |
| T$_{90}$, minutes | 15.8 | 16.8 | 15.5 |
| Stress-Strain | | | |
| Tensile, MPa | 22.3 | 23.4 | 22.8 |
| Elongation, % | 529 | 563 | 530 |
| Modulus, 100%, MPa | 2.8 | 2.6 | 2.8 |
| Modulus, 300%, MPa | 11.7 | 11.4 | 12.1 |
| Rebound, 100° C., % | 69 | 68 | 69 |
| Hardness, Shore A, 100° C. | 63 | 62 | 64 |
| Tear strength, N, 95° C. | 74 | 62 | 53 |
| Rheovibron | | | |
| E' at 60° C., MPa | 13.4 | 12.1 | 15.1 |
| Tan.Delta at 60° C. | 0.07 | 0.08 | 0.05 |
| DIN Abrasion, cm$^3$ | 121 | 123 | 134 |

The tensile strength values are measures of maximum stress when the sample specimen reaches its maximum elongation. Such physical property is well known to those having skill in such art.

The elongation values are measures of maximum elongation of the sample specimen before failure. Such physical property is well known those having skill in such art.

The Shore A hardness values are measures of a sample's resistance to localized plastic deformation.

The Rebound values are measures of a sample's capacity to adsorb energy when it is deformed under load and recovers upon removing the applied load.

The DIN abrasion values are measures of volume loss of a sample upon exposure to an applied abrasive wheel under a load of 10 Newtons. Lower values are indicative of greater resistance to abrasion.

It is readily seen from Table 2 and Table 2A that the experimental Samples B–E have stress-strain modulus, rebound, hardness and Rheovibron dynamic properties similar to Controls A and F. However, the experimental Samples B–E exhibit higher tear strength and improved DIN abrasion (lower relative volume loss) than Controls A and F. This surprising result would be beneficial in tread compounds for improved treadwear and chip/chunk or tear resistance.

EXAMPLE II

Additional rubber samples are prepared using the rubber composition shown in the following Table 3 using a mixing procedure described in Example I except that no additional ingredients are added in the second non-productive mixing stage.

Samples thereof, and associated physical properties are similarly reported in Table 4 and Table 4A of the following Example II.

The samples are identified herein as Samples G–L with Sample G being a Control.

TABLE 3

|  | Parts |
| --- | --- |
| First Non-Productive Mix Stage |  |
| Polyisoprene rubber[1] | 100 |
| Carbon black[2] | 50 |
| Zinc oxide | 5 |
| Fatty acid | 2 |
| Antioxidant[3] | 2 |
| Aromatic rubber processing oil[6] | Variable |
| Mono-hydroxyl terminated polyalkylene polymer[7] | Variable |
| Di-hydroxyl terminated polyalkylene polymer[8] | Variable |
| Second Non-Productive Mix Stage |  |
| No additional ingredients added |  |
| Productive Mix Stage |  |
| Sulfur | 1.4 |
| Accelerator, sulfenamide type | 1 |

TABLE 4

| Ingredients | Sample G Control | Sample H | Sample I |
| --- | --- | --- | --- |
| Processing oil | 5 | 2.5 | 0 |
| Mono-hydroxyl terminated polyalkylene polymer | 0 | 2.5 | 5 |
| DI-hydroxyl terminated polyalkylene polymer | 0 | 0 | 0 |
| Properties |  |  |  |
| Rheometer (150° C.) |  |  |  |
| Max. Torque, dNm | 37.3 | 36 | 36 |
| Min. Torque, dNm | 6.3 | 6.5 | 6.3 |
| Delta torque | 31 | 29.5 | 29.7 |
| $T_{90}$, minutes | 14.3 | 14.5 | 14 |
| Stress-Strain |  |  |  |
| Tensile, MPa | 24.1 | 23.9 | 23.4 |
| Elongation, % | 572 | 577 | 555 |
| Modulus, 100%, MPa | 2.15 | 3.07 | 2.12 |
| Modulus, 300%, MPa | 11.3 | 10.8 | 11.2 |
| Rebound, 100° C., % | 63 | 62 | 62 |
| Hardness, Shore A, 100° C. | 57 | 56 | 56 |
| Tear strength, N, 95° C. | 142 | 154 | 160 |
| Rheovibron |  |  |  |

TABLE 4-continued

| Ingredients | Sample G Control | Sample H | Sample I |
| --- | --- | --- | --- |
| E' at 60° C., MPa | 14 | 12 | 13 |
| Tan.Delta at 60° C. | 0.09 | 0.09 | 0.09 |
| DIN Abrasion, cm³ loss | 114 | 115 | 115 |

TABLE 4A

| Ingredients | Sample J | Sample K | Sample L |
| --- | --- | --- | --- |
| Processing oil | 2.5 | 0 | 5 |
| Mono-hydroxyl terminated polyalkylene polymer | 0 | 0 | 0 |
| DI-hydroxyl terminated polyalkylene polymer | 2.5 | 5 | 0 |
| Properties |  |  |  |
| Rheometer (150° C.) |  |  |  |
| Max Torque, dNm | 36.8 | 35.8 | 37.5 |
| Min Torque, dNm | 6.8 | 6.5 | 6.7 |
| Delta torque | 30 | 29.3 | 30.8 |
| $T_{90}$, minutes | 13.8 | 13.8 | 14.5 |
| Stress-Strain |  |  |  |
| Tensile, MPa | 23.7 | 23.7 | 23.4 |
| Elongation, % | 563 | 559 | 549 |
| Modulus, 100%, MPa | 2.13 | 2.09 | 2.24 |
| Modulus, 300%, MPa | 11.2 | 11.1 | 11.6 |
| Rebound, 100° C., % | 63 | 63 | 63 |
| Hardness, Shore A, 100° C. | 57 | 55 | 57 |
| Tear strength, N, 95° C. | 145 | 180 | 141 |
| Rheovibron |  |  |  |
| E' at 60° C., MPa | 15 | 13 | 14 |
| Tan.Delta at 60° C. | 0.09 | 0.09 | 0.08 |
| DIN Abrasion, cm³ loss | 111 | 110 | 117 |

It is readily seen from Table 4 and Table 4A that the experimental samples H–K have stress-strain modulus, rebound, hardness and Rheovibron dynamic properties similar to controls G and L. However, experimental Samples H–K exhibit higher tear strength than controls G and L.

In addition, Samples J and K which contain di-hydroxyl terminated polyalkylene (Kraton 2203) also show improvement in DIN abrasion resistance (less cm³ loss is better).

EXAMPLE III

Additional rubber samples are prepared using the rubber composition shown in the following Table 5 using a mixing procedure described in Example I except that no additional ingredients are added in the second non-productive mixing stage.

Samples thereof, and associated physical properties are similarly reported in Table 6 and Table 6A of the following Example III.

The samples are identified herein as Samples M–R with Sample M being a Control.

TABLE 5

|  | Parts |
|---|---|
| First Non-Productive Mix Stage | |
| Polyisoprene rubber, synthetic | 50 |
| Emulsion SBR[1] | 50 |
| Carbon black | 50 |
| Zinc oxide | 5 |
| Fatty acid | 2 |
| Antioxidant | 2 |
| Aromatic rubber processing oil | Variable |
| Mono-hydroxyl terminated polyalkylene polymer | Variable |
| Di-hydroxyl terminated polyalkylene polymer | Variable |
| Second Non-Productive Mix Stage | |
| No additional ingredients added | 15 |
| Productive Mix Stage | |
| Sulfur | 1.4 |
| Accelerator, sulfenamide type | 1 |
| Accelerator, diphenylguanidine | 0.2 |

[1]An emulsion polymerization prepared styrene/butadiene copolymer rubber as PLF1502 from The Goodyear Tire & Rubber Company.

TABLE 6

| Ingredients | Sample M Control | Sample N | Sample O |
|---|---|---|---|
| Processing oil | 5 | 2.5 | 0 |
| Mono-hydroxyl terminated polyalkylene polymer | 0 | 2.5 | 5 |
| DI-hydroxyl terminated polyalkylene polymer | 0 | 0 | 0 |
| Properties | | | |
| Rheometer (150° C.) | | | |
| Max Torque, dNm | 41.2 | 41 | 38.7 |
| Min Torque, dNm | 7.5 | 8 | 7.7 |
| Delta torque | 33.7 | 33 | 31 |
| T$_{90}$, minutes | 14.8 | 14.8 | 14.8 |
| Stress-Strain | | | |
| Tensile, MPa | 22.9 | 22.8 | 22.5 |
| Elongation, % | 507 | 501 | 502 |
| Modulus, 100%, MPa | 2.5 | 2.5 | 2.5 |
| Modulus, 300%, MPa | 12.8 | 12.9 | 12.4 |
| Rebound, 100° C., % | 58 | 58 | 56 |
| Hardness, Shore A, 100° C. | 60 | 60 | 58 |
| Tear strength, N, 95° C. | 88 | 83 | 89 |
| Rheovibron | | | |
| E' at 60° C., MPa | 17 | 17 | 18 |
| Tan.Delta at 60° C. | 0.11 | 0.12 | 0.11 |
| DIN Abrasion, cm³ loss | 103 | 100 | 97 |

TABLE 6A

| Ingredients | Sample P | Sample Q | Sample R |
|---|---|---|---|
| Processing oil | 2.5 | 0 | 5 |
| Mono-hydroxyl terminated polyalkylene polymer | 0 | 0 | 0 |
| DI-hydroxyl terminated polyalkylene polymer | 2.5 | 5 | 0 |
| Properties | | | |
| Rheometer (150° C.) | | | |
| Max Torque, dNm | 40.5 | 39 | 40.7 |
| Min Torque, dNm | 8 | 7.4 | 7.6 |
| Delta torque | 32.5 | 31.6 | 33.1 |
| T$_{90}$, minutes | 14.8 | 15 | 15 |
| Stress-Strain | | | |
| Tensile, MPa | 23.1 | 22.4 | 23.5 |
| Elongation, % | 499 | 488 | 516 |
| Modulus, 100%, MPa | 2.6 | 2.6 | 2.6 |
| Modulus, 300%, MPa | 13 | 12.9 | 12.7 |
| Rebound, 100° C., % | 58 | 57 | 58 |
| Hardness, Shore A, 100° C. | 59 | 58 | 59 |
| Tear strength, N, 95° C. | 87 | 89 | 76 |
| Rheovibron | | | |
| E' at 60° C., MPa | 17 | 17 | 17 |
| Tan.Delta at 60° C. | 0.11 | 0.12 | 0.1 |
| DIN Abrasion, cm³ loss | 97 | 99 | 96 |

It is readily seen from Table 6 and Table 6A that the experimental Samples N to R have stress-strain (tensile and elongation), modulus, rebound, hardness properties as well as Rheovibron dynamic properties similar to those of Control Sample M. However, in this Example, no improvement in tear resistance is obtained and only a slight improvement in DIN abrasion resistance is observed. It is, therefore, concluded that the polyisoprene component of the rubber blend composition should be above 50 phr in order to achieve the most improvement in tear and abrasion resistance.

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition comprised of, based upon 100 parts by weight of its rubber component (phr), (A) 100 parts by weight (phr) of at least one diene-based elastomer comprised of (i) about 55 to about 100 phr of cis 1,4-polyisoprene rubber and (ii) from zero to 45 phr of at least one other diene-based rubber selected from homopolymers and copolymers of conjugated diene and copolymers of at least one conjugated diene with a vinyl aromatic compound selected from styrene and alpha-methylstyrene, preferably styrene, (B) about one to about 50 phr of a liquid hydroxyl terminated polyalkylene polymer; wherein the alkylene mer unit for said polyalkylene is selected from at least one alkylene hydrocarbon containing from 2 to 5 carbon atoms, and where said polyalkylene polymer is (i) mono-hydroxyl terminated with a primary hydroxyl group or (ii) di-hydroxyl terminated with primary hydroxyl groups, (C) about 20 to about 100 phr of particulate reinforcing filler is (1) carbon black or (2) carbon black and silica-based reinforcement; wherein said silica-based reinforcement is selected from at least one of amorphous silica, aluminosilicate and carbon black which contains silicon on its surface; wherein said silica-based reinforcement contains hydroxyl groups on its surface, together with a coupling agent for said silica-based reinforcement; wherein said coupling agent contains a moiety which is reactive with hydroxyl groups on the surface of said silica-based reinforcement and with hydroxyl groups of said hydroxyl terminated polyalkylene polymer groups and another moiety interactive with said elastomer(s).

2. The rubber composition of claim 1 which comprises, based upon 100 parts by weight elastomer (phr), (A) 100 parts by weight (phr) of at least one diene-based elastomer comprised of (i) about 75 to about 100 phr of cis 1,4-polyisoprene rubber and (ii) about 0 to about 25 phr of at least one other diene-based rubber selected from homopolymers and copolymers of conjugated diene and copolymers of at least one conjugated diene with a vinyl aromatic compound selected from styrene and alpha-methylstyrene, preferably styrene, (B) about 2 to about 25 phr of said liquid hydroxyl terminated polyalkylene polymer; wherein the alkylene mer unit for said polyalkylene is selected from at least one of alkylene hydrocarbons containing from 2 to 4 carbon atoms, (C) about 35 to about 90 phr of particulate reinforcing filler as (1) carbon black or (2) carbon black and silica-based reinforcement; wherein said silica-based reinforcement is selected from at least one of amorphous silica, aluminosilicate and carbon black which contains silicon on its surface; wherein said silica-based reinforcement contains hydroxyl groups on its surface, together with a coupling agent for said silica-based reinforcement; wherein said coupling agent contains a moiety which is reactive with hydroxyl groups on the surface of said silica-based reinforcement and with hydroxyl groups of said hydroxyl terminated polyalkylene polymer groups and another moiety interactive with said elastomer(s).

3. The rubber composition of claim 1 wherein said reinforcement is comprised of carbon black and silica-based reinforcement together with a coupling agent wherein the weight ratio of said silica-based reinforcement to carbon black reinforcement is in a range of from 1/10 to 10/1.

4. The rubber composition of claim 2 wherein said reinforcement is comprised of carbon black and silica-based reinforcement together with a coupling agent wherein the weight ratio of said silica-based reinforcement to carbon black reinforcement is in a range of from 1/10 to 10/1.

5. The rubber composition of claim 1 wherein the said polyalkylene portion of said hydroxyl terminated polyalkylene comprised of at least one of ethylene, propylene and butylene units.

6. The rubber composition of claim 2 wherein said reinforcement is comprised of carbon black and silica-based reinforcement together with a coupling agent wherein the weight ratio of said silica-based reinforcement to carbon black reinforcement is in a range of from 1/10 to 10/1.

7. The rubber composition of claim 3 wherein said reinforcement is comprised of carbon black and silica-based reinforcement together with a coupling agent wherein the weight ratio of said silica-based reinforcement to carbon black reinforcement is in a range of from 1/10 to 10/1.

8. The rubber composition of claim 4 wherein said reinforcement is comprised of carbon black and silica-based reinforcement together with a coupling agent wherein the weight ratio of said silica-based reinforcement to carbon black reinforcement is in a range of from 1/10 to 10/1.

9. The rubber composition of claim 1 wherein said hydroxyl terminated polyalkylene polymer is monohydroxyl terminated.

10. The rubber composition of claim 2 wherein said hydroxyl terminated polyalkylene polymer is monohydroxyl terminated.

11. The rubber composition of claim 3 wherein said hydroxyl terminated polyalkylene polymer is monohydroxyl terminated.

12. The rubber composition of claim 4 wherein said hydroxyl terminated polyalkylene polymer is monohydroxyl terminated.

13. The rubber composition of claim 1 wherein said hydroxyl terminated polyalkylene polymer is di-hydroxyl terminated.

14. The rubber composition of claim 2 wherein said hydroxyl terminated polyalkylene polymer is di-hydroxyl terminated.

15. The rubber composition of claim 3 wherein said hydroxyl terminated polyalkylene polymer is di-hydroxyl terminated.

16. The rubber composition of claim 4 wherein said hydroxyl terminated polyalkylene polymer is di-hydroxyl terminated.

17. The rubber composition of claim 1 wherein the hydroxyl terminated polyalkylene is an hydrogenated polymer of at least one of isoprene and 1,3-butadiene which has been prepared by organic solvent solution polymerization.

18. The rubber composition of claim 2 wherein said hydroxyl terminated polyalkylene polymer is di-hydroxyl terminated.

19. The rubber composition of claim 3 wherein said hydroxyl terminated polyalkylene polymer is di-hydroxyl terminated.

20. The rubber composition of claim 4 wherein said hydroxyl terminated polyalkylene polymer is di-hydroxyl terminated.

21. The rubber composition of claim 1 wherein said liquid hydroxyl terminated polyalkylene polymer has an equivalent weight range from about 250 to about 70,000, provided that it is liquid at about 23° C.

22. The rubber composition of claim 2 wherein said liquid hydroxyl terminated polyalkylene polymer has an equivalent weight range from about 250 to about 70,000, provided that it is liquid at about 23° C.

23. The rubber composition of claim 3 wherein said liquid hydroxyl terminated polyalkylene polymer has an equivalent weight range from about 250 to about 70,000, provided that it is liquid at about 23° C.

24. The rubber composition of claim 4 wherein said liquid hydroxyl terminated polyalkylene polymer has an equivalent weight range from about 250 to about 70,000, provided that it is liquid at about 23° C.

25. The rubber composition of claim 1 wherein said cis 1,4-polyisoprene rubber is natural rubber.

26. The rubber composition of claim 2 wherein said cis 1,4-polyisoprene rubber is natural rubber.

27. The rubber composition of claim 3 wherein said cis 1,4-polyisoprene rubber is natural rubber.

28. The rubber composition of claim 4 wherein said cis 1,4-polyisoprene rubber is natural rubber.

29. The rubber composition of claim 1 wherein said additional elastomer is selected from at least one of polymers and copolymers of at least one of isoprene and 1,3-butadiene and copolymers of at least one of isoprene and 1,3-butadiene with styrene.

30. The rubber composition of claim 2 wherein said additional elastomer is selected from at least one of polymers and copolymers of at least one of isoprene and 1,3-butadiene and copolymers of at least one of isoprene and 1,3-butadiene with styrene.

31. The rubber composition of claim 3 wherein said additional elastomer is selected from at least one of polymers and copolymers of at least one of isoprene and 1,3-butdiene and copolymers of at least one of isoprene and 1,3-butadiene with styrene.

32. The rubber composition of claim 4 wherein said additional elastomer is selected from at least one of polymers and copolymers of at least one of isoprene and 1,3-butadiene and copolymers of at least one of isoprene and 1,3-butadiene with styrene.

33. The rubber composition of claim 1 wherein said additional elastomer is selected from at least one of cis 1,4-polybutadiene, styrene-butadiene copolymers(SBR), isoprene/butadiene copolymers and styrene/isoprene/butadiene terpolymers.

34. The rubber composition of claim 2 wherein said additional elastomer is selected from at least one of cis 1,4-polybutadiene, styrene-butadiene copolymers(SBR), isoprene/butadiene copolymers and styrene/isoprene/butadiene terpolymers.

35. The rubber composition of claim 3 wherein said additional elastomer is selected from at least one of cis 1,4-polybutadiene, styrene-butadiene copolymers(SBR), isoprene/butadiene copolymers and styrene/isoprene/butadiene terpolymers.

36. The rubber composition of claim 4 wherein said additional elastomer is selected from at least one of cis 1,4-polybutadiene, styrene-butadiene copolymers(SBR), isoprene/butadiene copolymers and styrene/isoprene/butadiene terpolymers.

37. An article of manufacture having at least one component comprised of the rubber composition of claim 1.

38. A tire having at least one component comprised of the rubber composition of claim 1.

39. A tire having at least one component comprised of the rubber composition of claim 2.

40. A tire having a tread comprised of the rubber composition of claim 1.

41. A tire having a tread comprised of the rubber composition of claim 2.

42. A tire having a tread comprised of the rubber composition of claim 3.

43. A tire having a tread comprised of the rubber composition of claim 4.

44. A tire having a tread comprised of the rubber composition of claim 5.

45. A tire having a tread comprised of the rubber composition of claim 6.

46. A tire having a tread comprised of the rubber composition of claim 7.

47. A tire having a tread comprised of the rubber composition of claim 8.

48. A tire having a tread comprised of the rubber composition of claim 9.

49. A tire having a tread comprised of the rubber composition of claim 10.

50. A tire having a tread comprised of the rubber composition of claim 11.

51. A tire having a tread comprised of the rubber composition of claim 12.

52. A tire having a tread comprised of the rubber composition of claim 13.

53. A tire having a tread comprised of the rubber composition of claim 14.

54. A tire having a tread comprised of the rubber composition of claim 15.

55. A tire having a tread comprised of the rubber composition of claim 16.

56. A tire having a tread comprised of the rubber composition of claim 17.

57. A tire having a tread comprised of the rubber composition of claim 18.

58. A tire having a tread comprised of the rubber composition of claim 19.

59. A tire having a tread comprised of the rubber composition of claim 20.

60. A tire having a tread comprised of the rubber composition of claim 21.

61. A tire having a tread comprised of the rubber composition of claim 22.

62. A tire having a tread comprised of the rubber composition of claim 23.

63. A tire having a tread comprised of the rubber composition of claim 24.

64. A tire having a tread comprised of the rubber composition of claim 25.

65. A tire having a tread comprised of the rubber composition of claim 26.

66. A tire having a tread comprised of the rubber composition of claim 27.

67. A tire having a tread comprised of the rubber composition of claim 28.

68. A tire having a tread comprised of the rubber composition of claim 29.

69. A tire having a tread comprised of the rubber composition of claim 30.

70. A tire having a tread comprised of the rubber composition of claim 31.

71. A tire having a tread comprised of the rubber composition of claim 32.

* * * * *